United States Patent
Lee et al.

(10) Patent No.: US 12,230,779 B2
(45) Date of Patent: Feb. 18, 2025

(54) CATHODE FOR SECONDARY BATTERY AND METHOD FOR MANUFACTURING SAME

(71) Applicant: SK INNOVATION CO., LTD., Seoul (KR)

(72) Inventors: Dong Hoon Lee, Daejeon (KR); Min Hwan Kim, Daejeon (KR); Jung Min Yang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/496,585

(22) Filed: Oct. 7, 2021

(65) Prior Publication Data

US 2022/0140303 A1 May 5, 2022

(30) Foreign Application Priority Data

Oct. 29, 2020 (KR) .................. 10-2020-0142435

(51) Int. Cl.
*H01M 4/04* (2006.01)
*H01M 4/02* (2006.01)

(52) U.S. Cl.
CPC .... *H01M 4/0404* (2013.01); *H01M 2004/021* (2013.01); *H01M 2004/028* (2013.01)

(58) Field of Classification Search
CPC ......... H01M 4/0404; H01M 2004/021; H01M 2004/028
See application file for complete search history.

(56) References Cited

U.S. PATENT DOCUMENTS

2008/0206649 A1 * 8/2008 Kawashima ...... H01M 10/0567
429/324

FOREIGN PATENT DOCUMENTS

| EP | 3038187 A1 | 6/2016 | |
|---|---|---|---|
| EP | 3211695 A1 | 8/2017 | |
| JP | 2009048876 A * | 3/2009 | ............. H01M 4/13 |
| JP | 5274561 B2 | 8/2013 | |
| JP | 2017004608 A * | 1/2017 | ............ Y02E 60/10 |
| KR | 10-1678813 B1 | 11/2016 | |
| KR | 10-2016-0141448 A | 12/2016 | |

OTHER PUBLICATIONS

Inoue et al., JP 2009048876 A English Translation, Mar. 5, 2009.*
Yamane et al., JP 2017004608 A English Translation, Jan. 5, 2017.*
Extended European Search Report issued by the European Patent Office on Mar. 25, 2022.

* cited by examiner

*Primary Examiner* — Matthew T Martin
*Assistant Examiner* — Alexandra J Simmons
(74) *Attorney, Agent, or Firm* — IP & T GROUP LLP

(57) ABSTRACT

Proposed is a cathode for a secondary battery, which includes a cathode collector and a cathode mixture layer on the cathode collector, includes: a coating section at which the cathode mixture layer is formed with a uniform thickness; a non-coating section that is disposed on at least one edge of the coating section on the cathode collector and at which the cathode mixture layer is not formed; and a cushioning section at which the cathode mixture layer is formed with a thickness smaller than a thickness of the coating section at a location between the coating section and the non-coating section.

12 Claims, 5 Drawing Sheets

CATHODE FOR SECONDARY BATTERY AND METHOD FOR MANUFACTURING SAME

CROSS REFERENCE TO RELATED APPLICATION

The present application claims priority to Korean Patent Application No. 10-2020-0142435, filed Oct. 29, 2020, the entire contents of which is incorporated herein for all purposes by this reference.

BACKGROUND OF THE INVENTION

Field of the Invention

The present disclosure relates to the cathode for a secondary battery and a method for manufacturing same and, more particularly, to a cathode structure of a secondary battery which minimizes irregular wrinkling or folding, electrode fracture, etc., and a method for manufacturing the cathode structure.

Description of the Related Art

A secondary battery that can be charged and discharged is widely used as the energy source or an assistant power device of mobile devices. Further, a secondary battery is spotlighted as a power source for an electric vehicle (EV), a hybrid electric vehicle (HEV), a plug-in hybrid electric vehicle (plug-in HEV), etc. that have been proposed as measures for solving air pollution generated by existing gasoline vehicles, diesel vehicles, etc. that use fossil fuels, etc. Recently, it is required to develop a secondary battery having higher energy density to increase the distance-to-empty of electric vehicles.

A secondary battery is manufactured with an electrode assembly put in an electrode case together with an electrolyte. The electrode assembly, which is a structure composed of a cathode, an anode, and a separator, is classified into a stack type, a folding type, and a stack-folding type, etc., depending on the manufacturing method.

There is a need for a process of applying an electrode active material to one or both sides of a metal collector, manufacturing an electrode sheet by drying the electrode active material, rolling the electrode sheet, and slitting the electrode sheet into the unit of an electrode interval in order to manufacture the cathode and the anode of an electrode assembly.

A cathode collector is composed of a coating section to be coated with a cathode active material and a non-coating section that is disposed at both sides of the coating section in the longitudinal direction of the coating section and is not applied with a cathode mixture layer. The cathode mixture layer is applied to the coating section of the collector and the applied cathode mixture layer is rolled into a desired thickness.

As for rolling, an electrode sheet is generally continuously rolled by cylindrical rolling rollers and this process is repeated to obtain desired electrode thickness and electrode density. An electrode is rolled at a high rolling ratio to manufacture a secondary battery having a high energy density.

However, when an electrode sheet is rolled by rolling rollers, especially, when an electrode is rolled at a high rolling ratio, little pressure is applied to the non-coating section of a collector. Accordingly, waves or wrinkles are generated on the collector due to a difference of a collector elongation between the coating section and the non-coating section, and if severe, fracture occurs.

When waves or wrinkles are formed on an electrode, a gap is easily generated between the cathode mixture layer and the collector and the gap may considerably deteriorate of the performance of the electrode by causing separation of the cathode mixture layer. Further, if waves or wrinkles are severe, the entire electrode is fractured during rolling. When facture occurs, productivity and yield may be remarkably decreased, and if severe, rolling may not be performed at a desired thickness.

A technology of reducing the difference of an elongation between a coating section and a non-coating section during rolling by softening the non-coating section through IHA heating has been developed in the related art, but IHA output should be increased to sufficiently solve the problem of fracture. However, in this case, there is a problem that the quality is made poorer in the following processes such as welding due to excessive softening of a collector.

Accordingly, it is highly required to develop a technology that can fundamentally solve this problem.

Documents of Related Art (Patent Document 1) KR10-2016-0141448 A

SUMMARY OF THE INVENTION

The present disclosure has been made in an effort to solve the problems described above and an objective of the present disclosure is to optimize the thickness of an active material layer in the longitudinal direction of a collector after a rolling process with minimum fracture by minimizing the difference of an elongation between a coating section and a non-coating section, and to minimize the difference of an elongation between the coating section and the non-coating section in the rolling process by optimally designing a cushioning section between the coating section and the non-coating section before the rolling process.

A cathode for a secondary battery according to an embodiment of the present disclosure, which includes a cathode collector and a cathode mixture layer on the cathode collector, includes: a coating section at which the cathode mixture layer is formed with a uniform thickness; a non-coating section that is disposed on at least one edge of the coating section on the cathode collector and at which the cathode mixture layer is not formed; and a cushioning section at which the cathode mixture layer is formed with a thickness smaller than a thickness of the coating section at a location between the coating section and the non-coating section.

In the cathode for a secondary battery according to an embodiment of the present disclosure, the thickness of the cushioning section may gradually increase toward a second point that is a boundary between the cushioning section and the coating section from a first point that is a boundary between the non-coating section and the cushioning section.

In the cathode for a secondary battery according to an embodiment of the present disclosure, a third point may exist between the first point and the second point in the cushioning section, and a thickness of the cathode mixture layer at the third point in the cushioning section may be 30% to 80% of the thickness of the cathode mixture layer in the coating section.

In the cathode for a secondary battery according to an embodiment of the present disclosure, the third point may be spaced apart from the first point by 20% to 60% of a length from the first point to the second point on the collector.

In the cathode for a secondary battery according to an embodiment of the present disclosure, a fourth point may exist between the second point and the third point in the cushioning section, the thickness of the cathode mixture layer at the third point may be 20% to 50% of the thickness of the cathode mixture layer in the coating section, the thickness of the cathode mixture layer in the cushioning section may gradually increase from the third point to the fourth point, and a thickness difference between the third point and the fourth point may be within 30% of the thickness of the cathode mixture layer in the coating section.

In the cathode for a secondary battery according to an embodiment of the present disclosure, a fourth point may exist between the second point and the third point in the cushioning section, the thickness of the cathode mixture layer at the third point may be 50% to 60% of the thickness of the cathode mixture layer in the coating section, the thickness of the cathode mixture layer in the cushioning section may gradually increase from the third point to the fourth point, and a thickness difference between the third point and the fourth point may be within 20% of the thickness of the cathode mixture layer in the coating section.

In the cathode for a secondary battery according to an embodiment of the present disclosure, a fourth point may exist between the second point and the third point in the cushioning section, the thickness of the cathode mixture layer at the third point may be 60% to 70% of the thickness of the cathode mixture layer in the coating section, the thickness of the cathode mixture layer in the cushioning section may gradually increase from the third point to the fourth point, and a thickness difference between the third point and the fourth point may be within 15% of the thickness of the cathode mixture layer in the coating section.

In the cathode for a secondary battery according to an embodiment of the present disclosure, a distance between the third point and the fourth point on the collector may be 20% to 80% of a distance between the first point and the second point on the collector.

In the cathode for a secondary battery according to an embodiment of the present disclosure, a distance between the first point and the third point on the collector may be 10% to 30% of a distance between the first point and the second point on the collector.

In the cathode for a secondary battery according to an embodiment of the present disclosure, density of the cathode mixture layer in the coating section is 3.5 g/cc or more.

In the cathode for a secondary battery according to an embodiment of the present disclosure, loading of the cathode mixture layer in the coating section is 16.0 mg/cm$^2$ or more.

In the cathode for a secondary battery according to an embodiment of the present disclosure, a thickness of the cathode collector may be 15 μm or less.

In the cathode for a secondary battery according to an embodiment of the present disclosure, tensile strength of the collector corresponding to the non-coating section may be 12 kgf/mm$^2$ or more.

A method for manufacturing a cathode for a secondary battery according to an embodiment of the present disclosure includes: preparing a cathode collector; and applying a cathode mixture layer onto the cathode collector, in which, in the applying of the cathode mixture layer, a cathode, which includes a coating section at which the cathode mixture layer is formed with a uniform thickness in a predetermined region of the cathode collector, the non-coating section that is disposed on at least one edge of the coating section on the cathode collector and at which the cathode mixture layer is not formed, and a cushioning section applied with the cathode mixture layer with a thickness smaller than a thickness of the coating section between the coating section and the non-coating section, is formed.

The method of manufacturing a cathode for a secondary battery according to an embodiment of the present disclosure may further include rolling the coating section and the cushioning section under the same level of pressure after applying the cathode mixture layer.

As described above, according to the cathode for a secondary battery of the present disclosure and the method of manufacturing the cathode, wrinkles, fracture, etc. that are generated when the cathode is rolled are minimized by minimizing the elongation difference between the coating section and the non-coating section, whereby there is an effect that it is possible to manufacture a high-quality cathode by reducing the defect ratio of an electrode.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
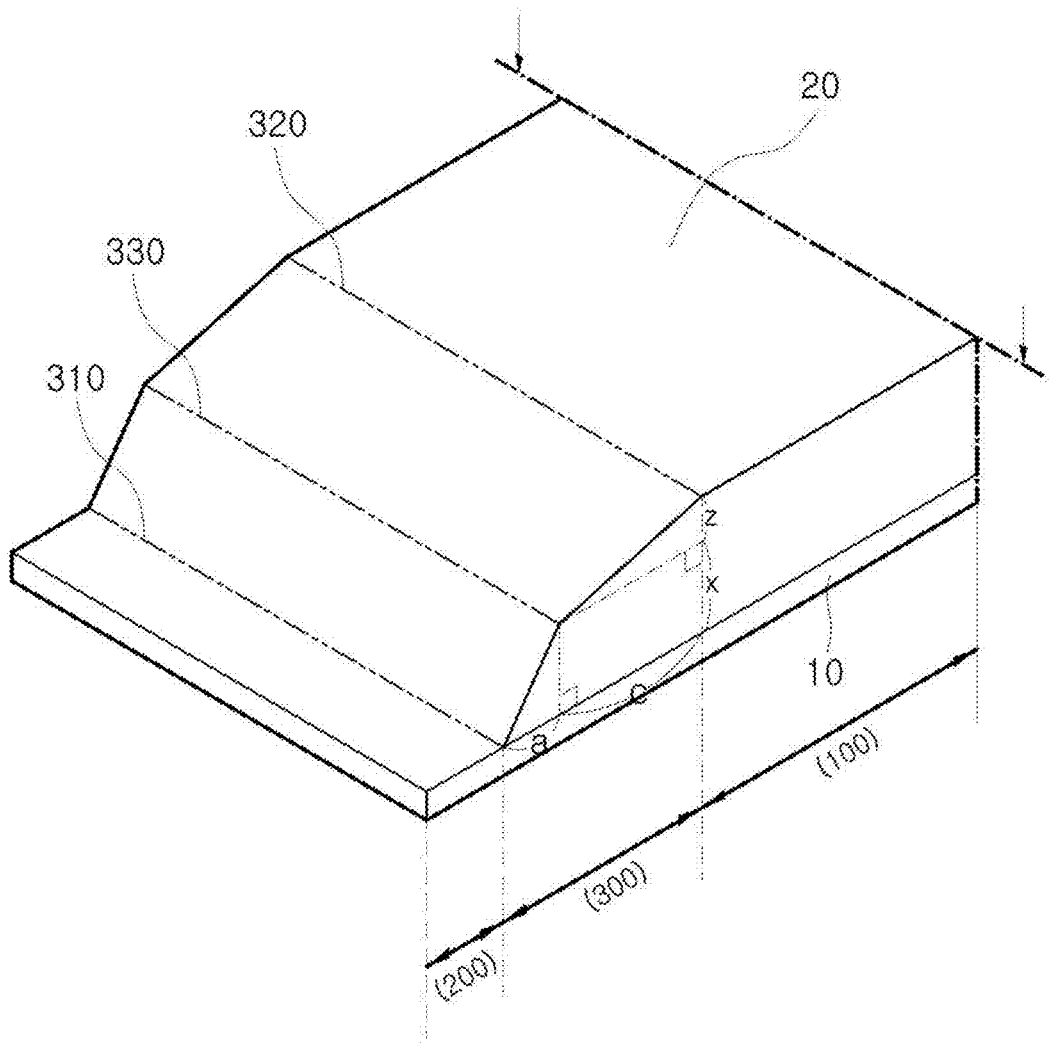
FIG. 1 is a perspective view of a cathode for a secondary battery after a rolling process according to a first embodiment of the present disclosure.

The objectives, specific features, and new features of the present disclosure will be more apparent from the following detailed description and embodiments relating to the accompanying drawings. It should be noticed that when reference numerals are given to components in the drawings in the specification, the same components are given the same number even if they are shown in different drawings. In the specification, terms 'a surface', 'another surface', 'first', 'second', etc. are used to discriminate one component from another component and the components are not limited to the terms. In the following description, well-known relevant technologies that may unnecessarily make the spirit of the present disclosure unclear are not described.

Hereafter, embodiments of the present disclosure are described in detail with reference to the accompanying drawings and the same reference numerals are given to the same components.

It is necessary to apply a high-density cathode in order to achieve a secondary battery having high-energy density. In order to apply a high-density cathode, it is required to roll a cathode collector 10 coated with a cathode mixture layer 20.

The present disclosure relates to the shape of a secondary battery electrode 1, in which a cathode mixture layer 20 is rolled at high density and a collector 10 is not fractured in a rolling process, and a method for manufacturing the secondary battery electrode 1.

The cathode for a secondary battery according to the present disclosure will be described by separately exemplifying a cathode for a secondary battery after a rolling process and a cathode for a secondary battery before a rolling process. First, the cathode for a secondary battery after a rolling process, which is a resultant obtained by rolling a cathode designed to prevent fracture of a collector, corresponds to the embodiments 1 and 2 to be described below. The cathode for a secondary battery before a rolling process, which is a cathode obtained by coating a collector with a cathode mixture layer before rolling, will be stated in a method for manufacturing a cathode for a secondary battery to be described in the following embodiment 3.

A cathode for a secondary battery according to the present disclosure is composed of a cathode collector and a cathode mixture layer. The cathode collector is not specifically limited as long as it has high conductivity without causing a chemical change in a battery, and may be made of aluminum, stainless steel, nickel, titanium, baked carbon, or aluminum or stainless steel with a surface treated with carbon, nickel, titanium, silver, etc. The cathode mixture layer may include a cathode active material, a conductive additive, a binder, etc. The cathode active material may be a layered compound such as a lithium cobalt oxide ($LiCoO_2$) and a lithium nickel oxide ($LiNiO_2$) or may be a compound substituted by one or more transition metals, but is not limited thereto. As the conductive additive, conductive carbon is generally used, and various conductive carbon materials such as graphite, carbon black, acetylene black, ketjen black, super-P, and carbon nanotube may be used.

Figure 2:
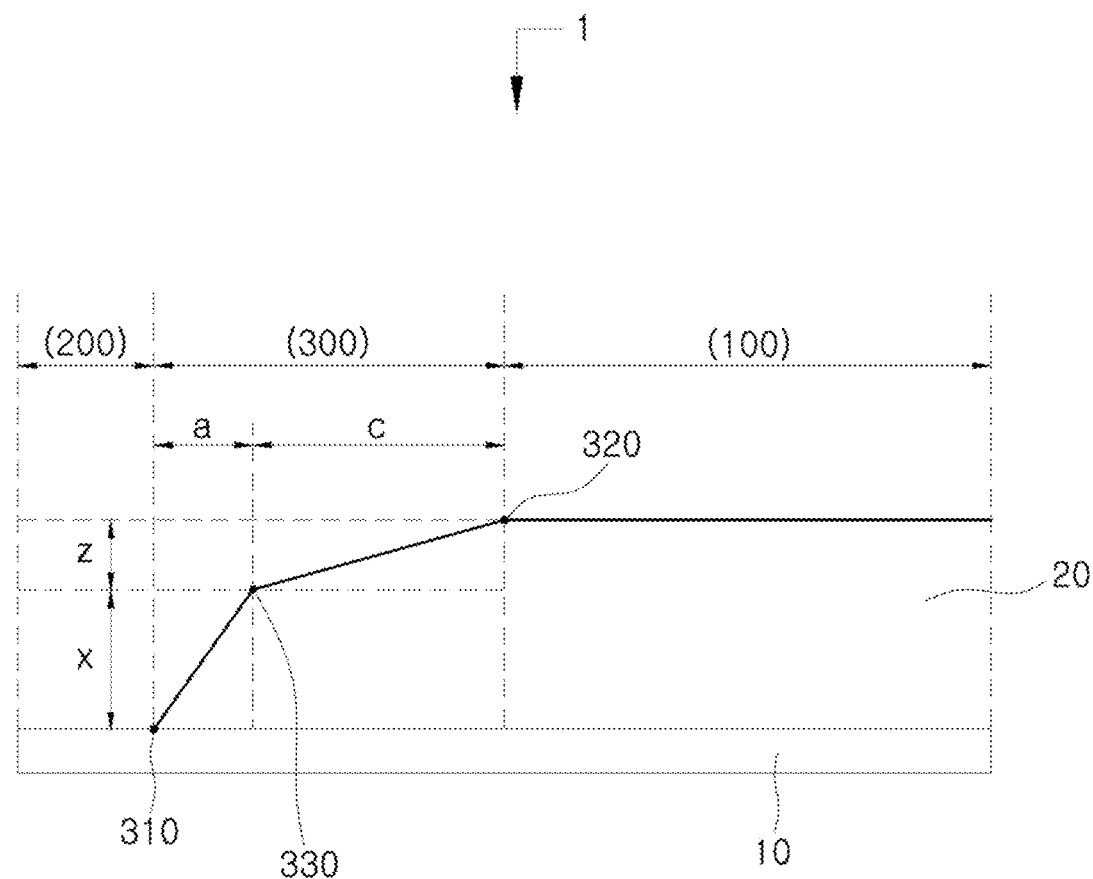
FIG. 2 is a cross-sectional view of the cathode for a secondary battery of the present disclosure shown in FIG. 1.

FIGS. 1 and 2 show a secondary battery electrode 1 according to an embodiment of the present disclosure.

A cathode 1 for a secondary battery according to an embodiment of the present disclosure includes a cathode collector 10 and a cathode mixture layer 20 on the cathode collector 10. The cathode 1 for a secondary battery includes: a coating section 100 at which the cathode mixture layer 20 is formed with a uniform thickness; a non-coating section 200 that is disposed on at least one edge of the coating section 100 on the cathode collector 10 and at which the cathode mixture layer 20 is not formed; and a cushioning section 300 at which the cathode mixture layer 20 is formed with a thickness smaller than the thickness of the coating section 100 at a location between the coating section 100 and the non-coating section 200.

Figure 3:
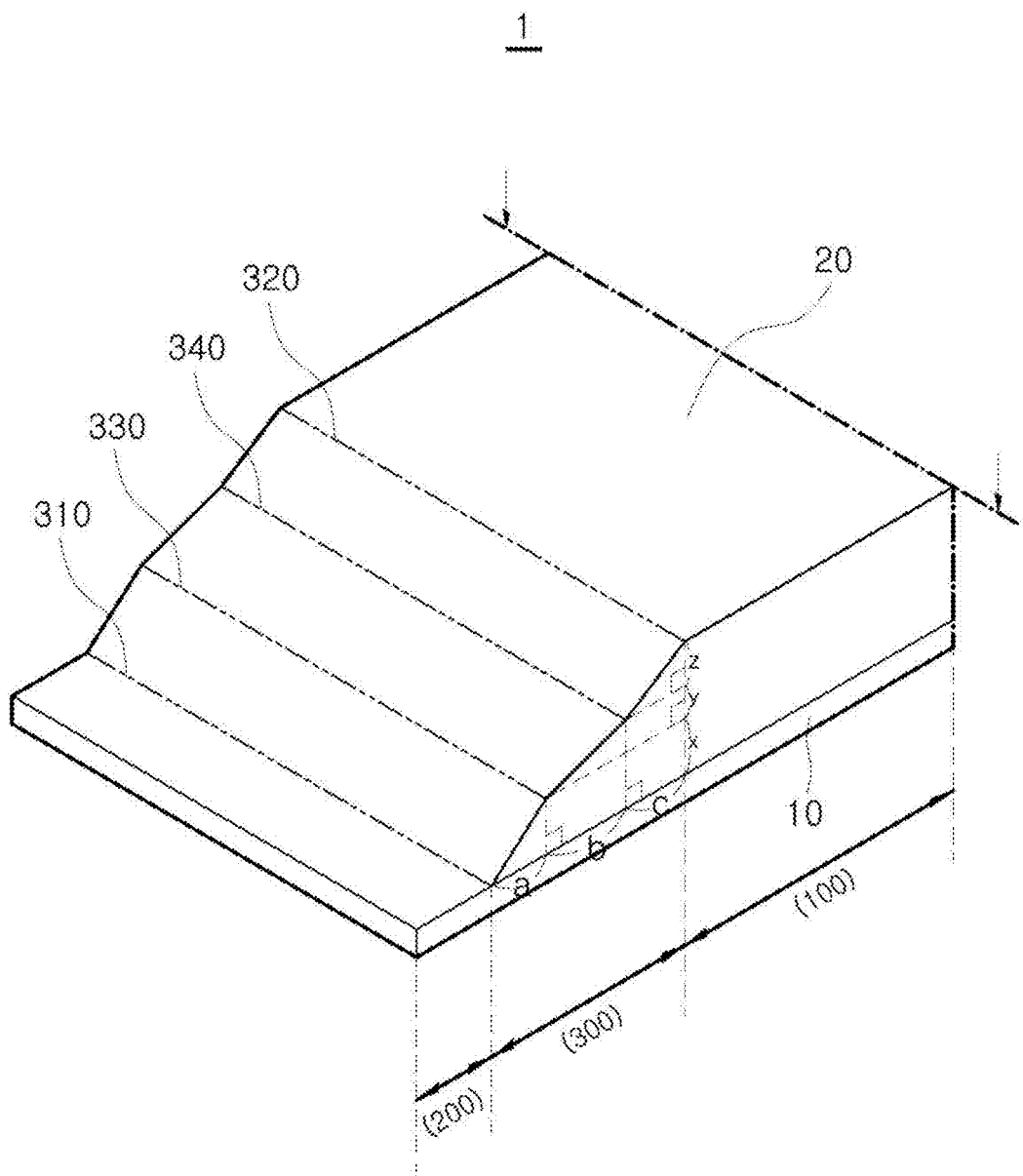
FIG. 3 is a perspective view of a cathode for a secondary battery after a rolling process according to a second embodiment of the present disclosure.

Referring to FIGS. 1 and 2, the cathode 1 of the present disclosure is composed of a cathode collector 10 and a cathode mixture layer 20 coated on the collector 10. The cathode 1 is divided into the coating section 100, the non-coating section 200, and the cushioning section 300. The coating section 100 is the part coated with the cathode mixture layer 20 with a predetermined thickness on the cathode collector 10. It can be seen from FIG. 1 that the coating section 100 is formed with a uniform thickness. The non-coating section 200 may be disposed at both sides or one edge of the coating section 100 in the longitudinal direction of the coating section 100. The non-coating section 200 is the part at which the cathode mixture layer 20 is not formed on the collector 10. The cushioning section 300 is formed with a thickness smaller than the thickness of the cathode mixture layer 20. Referring to FIG. 1, the cushioning section 300 is positioned between the coating section 100 and the non-coating section 200 and minimizes an elongation difference between the coating section 100 and the non-coating section 200 when the electrode 1 is rolled. The cushioning section 300 may be formed such that the cathode mixture layer 20 has two or more different slopes of thickness. That is, the cushioning section 300 may be formed to have two slopes of thickness, as shown in FIG. 1, or may be formed to have three slopes of thickness, as shown in FIG. 3, or may be formed to have more slopes of thickness. Although the ratio is not accurately shown in FIGS. 1 to 4, the cushioning section 300 is greatly larger in length than thickness. For example, if the thickness of the cushioning section 300 is 110 μm, the length thereof may be about 5 mm. That is, the width length between the coating section 100 and the non-coating section 200 is remarkably larger than the thickness between the coating section 100 and the non-coating section 200, whereby the cushioning section 300 can perform cushioning that minimizes the elongation difference between the coating section 100 and the non-coating section 200.

In the cathode 1 for a secondary battery according to an embodiment of the present disclosure, the thickness of the cushioning section 300 may gradually increase toward a second point 320, which is the boundary between the cushioning section 300 and the coating section 100, from a first point 310 that is the boundary between the non-coating section 200 and the cushioning section 300.

The boundary between the non-coating section 200 and the cushioning section 300 is referred to as the first point 310. That is, the first point 310 is the boundary between the parts at which the cathode mixture layer 20 is formed and is not formed, respectively, on the collector, and accordingly, the thickness of the cathode mixture layer 20 at the first point 310 is 0. The second point 320 is the boundary between the part at which the thickness of the cathode mixture layer 20 in the coating section 100 is uniform and the cushioning section 300 smaller in thickness than the cathode mixture layer 20 in the coating section 100, and accordingly, the thickness of the cathode mixture layer 20 at the second point 320 is the same as the thickness of the cathode mixture layer 20 in the coating section 100.

The thickness of the cathode mixture layer 20 at the first point 310 is 0% to the thickness of the cathode mixture layer 20 in the coating section 100, and the thickness of the cathode mixture layer 20 at the second point 320 is 100% to the thickness of the cathode mixture layer 20 in the coating section 100. Accordingly, the thickness of the cathode mixture layer 20 in the cushioning section 300 gradually increases from 0% to 100% to the thickness of the cathode mixture layer 20 in the coating section 100 as it goes from the first point 310 to the second point 320.

In the cathode 1 for a secondary battery according to an embodiment of the present disclosure, a third point 330 may exist between the first point 310 and the second point 320 in the cushioning section.

In the following description, 'a' is the gap between the first point 310 and the third point 330 on the plane of the cathode collector 10 and 'c' is the gap between the second point 320 and the third point 330 on the plane of the cathode collector 10. Further, 'x' is the thickness difference between the first point 310 and the third point 330 in the direction perpendicular to the plane of the cathode collector 10 and 'z' is the thickness difference between the second point 320 and the third point 330 in the direction perpendicular to the plane of the cathode collector 10.

TABLE 1

|  |  | Electrode after rolling (rolled electrode) |  |  |  | a/ (a + c) | (x/ (x + z) |
|---|---|---|---|---|---|---|---|
|  |  | a(mm) | c(mm) | x(um) | z(um) |  |  |
| Embodiment 1 | No. 1-1 | 1 | 4 | 55 | 56 | 0.2 | 0.50 |
|  | No. 1-2 | 1 | 4 | 84 | 27 | 0.2 | 0.76 |
|  | No. 1-3 | 1 | 4 | 41 | 69 | 0.2 | 0.37 |
|  | No. 1-4 | 1 | 2 | 60 | 49 | 0.33333 | 0.55 |
|  | No. 1-5 | 4 | 3 | 47 | 64 | 0.57143 | 0.42 |
| Comparative example |  | 1 | 0 | 97 | 14 | 1.00 | 0.87 |
| Embodiment 1' | No. 1'-1' | 1 | 4 | 98 | 12 | 0.20 | 0.89 |
|  | No. 1'-2' | 1 | 4 | 20 | 90 | 0.20 | 0.18 |
|  | No. 1'-3' | 1 | 10 | 55 | 55 | 0.09 | 0.50 |
|  | No. 1'-4' | 9 | 2 | 55 | 55 | 0.82 | 0.50 |

TABLE 2

|  |  | Cathode loading mg/cm$^2$ | Density g/cc | Thickness of collector mm | Tensile strength of collector kgf/mm$^2$ | Number of fractures during conveying of 2000 mm Number of times |
|---|---|---|---|---|---|---|
| Embodiment 1 | No. 1-1 | 18.39 | 3.71 | 12 | 16.8 | 0 |
|  | No. 1-2 | 18.33 | 3.70 | 12 | 17.3 | 0 |
|  | No. 1-3 | 18.27 | 3.72 | 12 | 16.2 | 0 |
|  | No. 1-4 | 18.26 | 3.75 | 12 | 17.5 | 0 |
|  | No. 1-5 | 18.36 | 3.69 | 12 | 17.2 | 0 |
| Comparative example |  | 18.33 | 3.70 | 12 | 16.5 | 2 |
| Embodiment 1' | No. 1'-1' | 18.26 | 3.73 | 12 | 17 | 2 |
|  | No. 1'-2' | 18.35 | 3.74 | 12 | 17 | 0 |
|  | No. 1'-3' | 18.32 | 3.74 | 12 | 17 | 2 |
|  | No. 1'-4' | 18.32 | 3.74 | 12 | 17 | 0 |

The examples corresponding to the embodiment 1 of the present disclosure were indicated by 1-1 to 1-5, and the examples corresponding to the embodiment 1' were indicated by 1'-1' to 1'-4'.

The comparative example is a test result when the cushioning section of the present disclosure is not formed, and it can be seen from the comparative example that the numbers of fracture were larger than those of other examples. That is, it is possible to remarkably reduce fracture of a cathode by forming the cushioning section of the present disclosure.

In the cathode 1 for a secondary battery according to an embodiment of the present disclosure, the third point 330 may exist between the first point 310 and the second point 320 of the cushioning section 300, and the thickness of the cathode mixture layer 20 at the third point 330 in the cushioning section 300 may be 30% to 80% of the thickness of the cathode mixture layer 20 in the coating section.

In the cathode 1 for a secondary battery according to an embodiment of the present disclosure, the third point 330 may be spaced part from the first point 310 by 20% to 60% of the length from the first point 310 to the second point 320 on the collector 10.

Referring to FIGS. 1 and 2, when the gap between the first point 310 and the third point 330 on the collector 10 is 'a' and the gap between the third point 330 and the second point 320 on the collector 10 is 'c', $0.2 \leq a/(a+c) \leq 0.6$ is satisfied.

It can be seen from Table 1 that the term a/a+c is between 0.2 and 0.6, and when the cathode is conveyed 2000 mm for rolling on the basis of the value, the density of the cathode 1 may be 3.69 g/cc or more without fracture.

Considering that the number of fractures during conveying of 2000 mm is 0 and density is 3.69 g/cc or more in the embodiment 1, it can be seen that the cathode mixture layer 20 was sufficiently compressed and there were no fractures in the collector 10.

Referring to No. 1'-3' and No. 1'-4' in the embodiment 1', the term a/a+c is 0.09 and 0.82, respectively. When 'a' increases and a/a+c exceeds 0.6, as in No. 1'-4', the capacity of the cathode mixture layer 20 may greatly decrease. However, when 'c' increases and a/a+c becomes less than 0.2, as in No. 1'-3', the effect of preventing fracture may be decreased significantly. Accordingly, it is preferable in terms of the capacity and density of a battery that a/a+c is between 0.2 and 0.6.

When the thickness difference of the cathode mixture layer at the first point 310 and the third point 330 is 'x' and the thickness difference between the third point 330 and the second point 320 is 'z', $0.3 \leq x/(x+z) \leq 0.8$ can be satisfied.

In the cathode 1 for a secondary battery according to an embodiment of the present disclosure, x/(x+z) may be between 0.3 and 0.8, and the density of the cathode 1 may be 3.69 g/cc or more without fracture when the cathode is conveyed 2000 mm for rolling on the basis of the value.

Referring to Table 1, it can be seen that the term x/(x+z) is between 0.3 and 0.8 in the embodiment 1. Considering that the number of fractures during conveying of 2000 mm is 0 and density is 3.69 g/cc or more in the embodiment 1, it can be seen that the cathode mixture layer 20 was sufficiently compressed and there were no fractures in the collector 10.

Referring to Nos. 1'-1' and 1'-2' in the embodiment 1', the term x/(x+z) is 0.89 and 0.18, respectively. When the ratio x/(x+z) is excessively large, as in No. 1'-1', the cathode mixture layer 20 loaded on the cushioning section 300 becomes thick and the effect of minimizing the elongation difference is lost, so fracture occurs (twice during conveying of 2000 mm). When the ratio x/(x+z) is excessively small, as in No. 1'-2', the cathode mixture layer 20 is excessively thin, so coating is substantially impossible. Accordingly, when the ratio x/(x+z) is between 0.3 and 0.8, unlike the Nos. 1'-1' and 1'-2' in the embodiment 1', the number of fractures during conveying of 2000 mm can be maintained as 0 and ease of coating can be secured.

In a cathode 1 for a secondary battery according to a second embodiment of the present disclosure, the cushioning section 300 may have three different slopes. That is, a fourth point 340 may exist between the second point 320 and the third point 330 in the cushioning section 300.

In the following description, 'a' is the gap between the first point 310 and the third point 330 on the plane of the cathode collector 10, 'b' is the gap between the third point 330 and the fourth point 340 on the plane of the cathode collector 10, and 'c' is the gap between the fourth point 340 and the second point 320 on the plane of the cathode collector 10. Further, 'x' is the thickness difference between the first point 310 and the third point 330 in the direction perpendicular to the plane of the cathode collector 10, 'y' is the thickness difference between the third point 330 and the fourth point 340 in the direction perpendicular to the plane of the cathode collector 10, and 'z' is the thickness difference between the fourth point 340 and the second point 320 in the direction perpendicular to the plane of the cathode collector 10.

Figure 5:
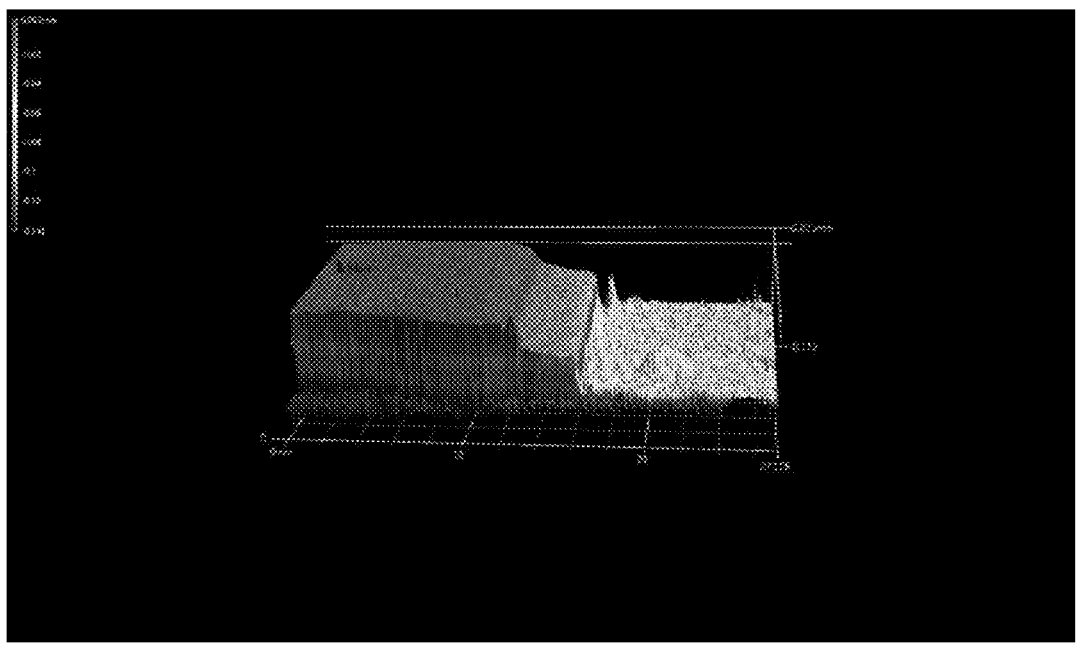
FIG. 5 is an actually measured 3D cross-sectional view of the cathode for a secondary battery after a rolling process according to the second embodiment of the present disclosure.

FIG. 5 is an actually measured 3D cross-sectional view of the cathode 1 for a secondary battery after a rolling process according to the second embodiment of the present disclosure. It can also be seen in the section between 10 mm and 20 mm on the horizontal axis from the 3D view of FIG. 5 that as the thickness of the cathode mixture layer 20 changes, the slope of the cathode mixture layer 20 changes, whereby the first point 310, second point 320, third point 330, and fourth point 340 are formed. Accordingly, it can be seen from FIG. 5 that the structure of the cathode 1 for a secondary battery of the present disclosure is a structure that can be substantially formed.

In the cathode 1 for a secondary battery according to the second embodiment of the present disclosure, a fourth point 340 may exist between the second point 320 and the third point 330 in the cushioning section, the thickness of the cathode mixture layer 20 at the third point 330 may be 20% to 50% of the thickness of the cathode mixture layer 20 in the coating section 100, the thickness of the cathode mixture layer 20 in the cushioning section 300 may gradually increase from the third point 330 to the fourth point 340, and the thickness difference between the third point 330 and the fourth point 340 may be within 30% of the thickness of the cathode mixture layer 20 in the coating section 100.

The boundary between the non-coating section 200 and the cushioning section 300 may be referred to as the first point 310 and the boundary between the cushioning section 300 and the coating section 100 may be referred to as the second point 320. That is, the first point 310 is the boundary between the parts at which the cathode mixture layer 20 is formed and is not formed, respectively, on the collector, and accordingly, the thickness of the cathode mixture layer 20 at the first point may be 0. The second point 320 is the boundary between the part at which the thickness of the cathode mixture layer 20 in the coating section 100 is uniform and the cushioning section 300 smaller in thickness than the cathode mixture layer 20 in the coating section 100, and accordingly, the thickness of the cathode mixture layer 20 at the second point 320 may be the same as the thickness of the cathode mixture layer 20 in the coating section 100.

In the cathode 1 for a secondary battery according to the second embodiment of the present disclosure, 0.2≤x/(x+y+z)≤0.5 can be satisfied, and the thickness change (y) from the third point 330 to the fourth point 340 can satisfy y/(x+y+z)≤0.3.

Referring to the data of Nos. 2-6 and 2-8 in the embodiment 2 in Table 4, it can be seen that the term x/(x+y+z) is between 0.2 and 0.5, and in this case, the term y/(x+y+z) is 0.3 or less. Considering that the number of fractures during conveying of 2000 mm is 0 and density is 3.69 g/cc or more in the data of Nos. 6 and 8, it can be seen that the cathode

TABLE 3

| | | Electrode after rolling (rolled electrode) | | | | | | a/(a + b + c) | b/(a + b + c) | c/(a + b + c) |
|---|---|---|---|---|---|---|---|---|---|---|
| | | a(mm) | b(mm) | c(mm) | x(um) | y(um) | z(um) | | | |
| Embodiment 2 | No. 2-6 | 1 | 6 | 1 | 52 | 26 | 32 | 0.125 | 0.75 | 0.125 |
| | No. 2-7 | 1 | 6 | 1 | 76 | 11 | 23 | 0.125 | 0.75 | 0.125 |
| | No. 2-8 | 1 | 4 | 3 | 28 | 32 | 50 | 0.125 | 0.5 | 0.375 |
| | No. 2-9 | 2 | 4 | 2 | 58 | 22 | 31 | 0.25 | 0.5 | 0.25 |

TABLE 4

| | | x/(x + y + z) | y/(x + y + z) | z/(x + y + z) | Cathode loading mg/cm$^2$ | Density g/cc | Thickness of collector mm | Tensile strength of collector kgf/mm$^2$ | Number of fractures during conveying of 2000 mm Number of times |
|---|---|---|---|---|---|---|---|---|---|
| Embodiment 2 | No. 6 | 0.472727 | 0.23636 | 0.2909 | 18.2 | 3.714286 | 12 | 16.5 | 0 |
| | No. 7 | 0.690909 | 0.1 | 0.20909 | 18.33 | 3.740816 | 12 | 17.1 | 0 |
| | No. 8 | 0.254545 | 0.290909 | 0.454545 | 18.27 | 3.728571 | 12 | 16.6 | 0 |
| | No. 9 | 0.522523 | 0.198198 | 0.279279 | 18.3 | 3.69697 | 12 | 16.6 | 0 | mixture layer 20 was sufficiently compressed and there were no fractures in the collector 10.

That is, when the thickness difference between the first point 310 and the third point 330 is 20 to 50% of the thickness of the cathode mixture layer 20 in the coating section 100, it is preferable that the thickness difference between the third point 330 and the fourth point 340 formed at the middle portion of the cushioning section 300 is within 30% of the coating section 100. Since the thickness of the cushioning section 300 should not rapidly change to achieve the main function thereof that suppresses fracture when the cathode 1 is rolled, the thickness change from the third point 330 to the fourth point 340 is limited in the basis of the thickness change between the first point 310 and the third point 330.

In the cathode 1 for a secondary battery according to the second embodiment of the present disclosure, a fourth point 340 may exist between the second point 320 and the third point 330 in the cushioning section 300, the thickness of the cathode mixture layer 20 at the third point 330 may be 50% to 60% of the thickness of the cathode mixture layer 20 in the coating section 100, the thickness of the cathode mixture layer 20 in the cushioning section 300 may gradually increase from the third point 330 to the fourth point 340, and the thickness difference between the third point 330 and the fourth point 340 may be within 20% of the thickness of the cathode mixture layer 20 in the coating section 100.

In the cathode 1 for a secondary battery according to the second embodiment of the present disclosure, $0.5 \leq x/(x+y+z) \leq 0.6$ can be satisfied, and the thickness change (y) from the third point 330 to the fourth point 340 can satisfy $y/(x+y+z) \leq 0.2$.

Referring to the data of No. 2-9 in the embodiment 2 in Table 4, it can be seen that the term $x/(x+y+z)$ is between 0.5 and 0.6, and in this case, the term $y/(x+y+z)$ is 0.2 or less. Considering that the number of fractures during conveying of 2000 mm is 0 and density is 3.69 g/cc or more in the data of No. 2-9, it can be seen that the cathode mixture layer 20 was sufficiently compressed and there were no fractures in the collector 10.

That is, when the thickness difference between the first point 310 and the third point 330 is 50 to 60% of the thickness of the cathode mixture layer 20 in the coating section 100, it is preferable that the thickness difference between the third point 330 and the fourth point 340 formed at the middle portion of the cushioning section 300 is within 20% of the coating section 100. Since the thickness of the cushioning section 300 should not rapidly change to achieve the main function thereof that suppresses fracture when the cathode 1 is rolled, the thickness change from the third point 330 to the fourth point 340 is limited in the basis of the thickness change between the first point 310 and the third point 330. Comparing with Nos. 2-6 and 2-8 in the embodiment 2, in No. 2-9, $x/(x+y+z)$ becomes larger and the thickness change from the first point 310 to the third point 330 in the cushioning section 300 increases, so the range of $y/(x+y+z)$ is decreased to suppress a rapid increase of the thickness change of the entire cushioning section 300.

In the cathode 1 for a secondary battery according to the second embodiment of the present disclosure, a fourth point 340 may exist between the second point 320 and the third point 330 in the cushioning section, the thickness of the cathode mixture layer 20 at the third point 330 may be 60% to 70% of the thickness of the cathode mixture layer 20 in the coating section 100, the thickness of the cathode mixture layer 20 in the cushioning section 300 may gradually increase from the third point 330 to the fourth point 340, and the thickness difference between the third point 330 and the fourth point 340 may be within 15% of the thickness of the cathode mixture layer 20 in the coating section 100.

In the cathode 1 for a secondary battery according to the second embodiment of the present disclosure, $0.6 \leq x/(x+y+z) \leq 0.7$ can be satisfied, and the thickness change (y) from the third point 330 to the fourth point 340 can satisfy $y/(x+y+z) \leq 0.15$.

Referring to the data of No. 7 in the embodiment 2 in Table 4, it can be seen that the term $x/(x+y+z)$ is between 0.6 and 0.7, and in this case, the term $y/(x+y+z)$ is 0.15 or less. Considering that the number of fractures during conveying of 2000 mm is 0 and density is 3.69 g/cc or more in the data of No. 7, it can be seen that the cathode mixture layer 20 was sufficiently compressed and there were no fractures in the collector 10.

That is, when the thickness difference between the first point 310 and the third point 330 is 60 to 70% of the thickness of the cathode mixture layer 20 in the coating section 100, it is preferable that the thickness difference between the third point 330 and the fourth point 340 formed at the middle portion of the cushioning section 300 is within 15% of the coating section 100. Since the thickness of the cushioning section 300 should not rapidly change to achieve the main function thereof that suppresses fracture when the cathode 1 is rolled, the thickness change from the third point 330 to the fourth point 340 is limited in the basis of the thickness change between the first point 310 and the third point 330. Comparing with No. 2-9 in the embodiment 2, in No. 2-7, $x/(x+y+z)$ becomes larger and the thickness change from the first point 310 to the third point 330 in the cushioning section 300 increases, so the range of $y/(x+y+z)$ is decreased to suppress a rapid increase of the thickness change of the entire cushioning section 300.

In the cathode 1 for a secondary battery according to the present disclosure, the distance between the third point 330 and the fourth point 340 on the collector 10 may be 40% to 80% of the distance between the first point 310 and the second point 320 on the collector 10.

In the cathode 1 for a secondary battery according to the present disclosure, the distance between the first point 310 and the third point 330 on the collector 10 may be 10% to 30% of the distance between the first point 310 and the second point 320 on the collector 10.

Figure 4:
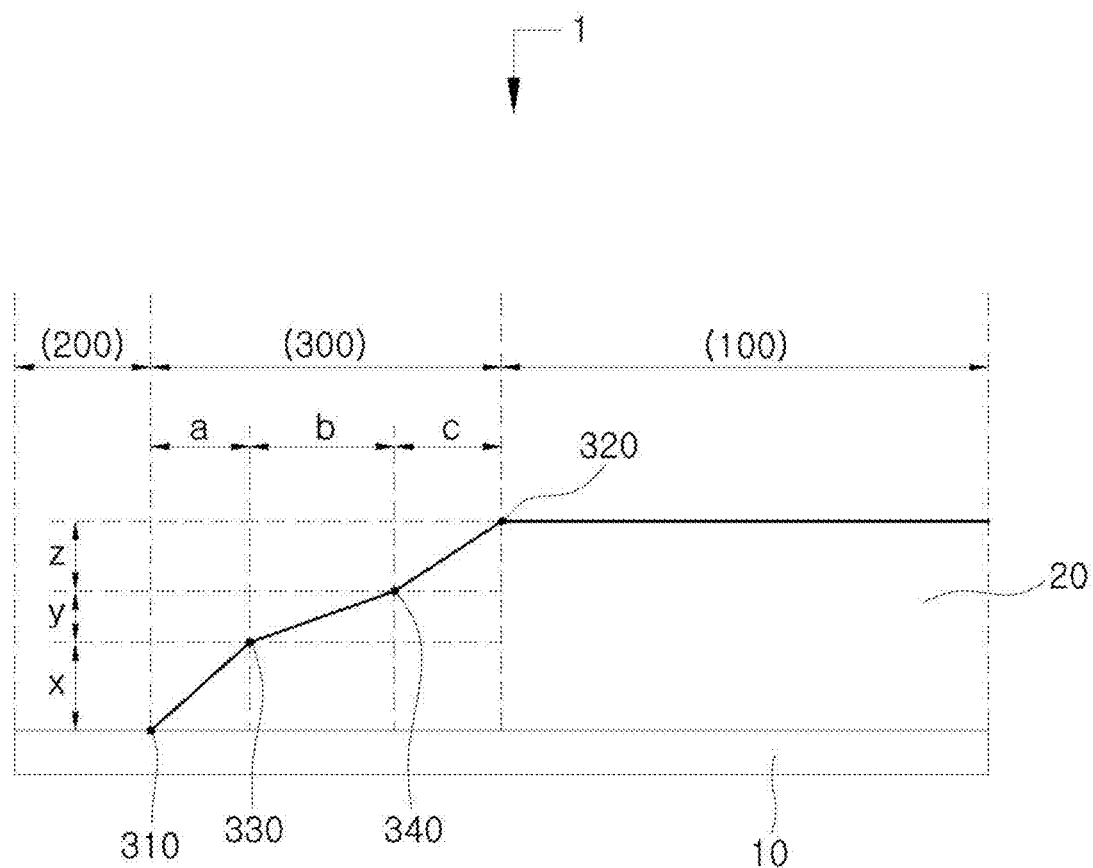
FIG. 4 is a cross-sectional view of the cathode for a secondary battery of the present disclosure shown in FIG. 2.

Referring to FIGS. 3 and 4, in the cathode 1 for a secondary battery according to the second embodiment of the present disclosure, when the gap between the first point 310 and the third point 330 is 'a', the gap between the third point 330 and the fourth point 340 is 'b', and the gap between the fourth point 340 and the second point 320 is 'c', $0.2 \leq b/(a+b+c) \leq 0.8$ can be satisfied. That is, the distance between the third point 330 and the fourth point 340 on the collector 10 may be 20% to 80% of the distance between the first point 310 and the second point 320 on the collector 10.

Referring to Table 3, it can be seen that the term $b/(a+b+c)$ is between 0.2 and 0.8 in Nos. 6 to 9 of the embodiment 2. That is, the density of the cathode 1 is 3.69 g/cc or more without fracture when the cathode is conveyed 2000 mm for rolling on the basis of the term $b/(a+b+c)$ between 0.2 to 0.8 in the embodiment 2. Considering that the number of fractures during conveying of 2000 mm is 0 and density is 3.69 g/cc or more in the embodiment 2, it can be seen that the cathode mixture layer 20 was sufficiently compressed and there were no fractures in the collector 10. Accordingly, it is preferable that the range of $b/(a+b+c)$ is between 0.2 and 0.8 in the embodiment 2.

Referring to FIGS. 3 and 4, in the cathode 1 for a secondary battery according to the second embodiment of the present disclosure, when the gap between the first point 310 and the third point 330 is 'a', the gap between the third point 330 and the fourth point 340 is 'b' and the gap between the fourth point 340 and the second point 320 is 'c', $0.1 \leq a/(a+b+c) \leq 0.3$ can be satisfied.

Referring to Table 3, it can be seen that the term $a/(a+b+c)$ is between 0.1 and 0.3 in Nos. 6 to 9 of the embodiment 2. That is, the density of the cathode 1 is 3.69 g/cc or more without fracture when the cathode is conveyed 2000 m for rolling on the basis of the term $a/(a+b+c)$ between 0.1 to 0.3 in the embodiment 2. Considering that the number of fractures during conveying of 2000 mm is 0 and density is 3.69 g/cc or more in the embodiment 2, it can be seen that the cathode mixture layer 20 was sufficiently compressed and there were no fractures in the collector 10. Accordingly, it is preferable that the range of $a/(a+b+c)$ is between 0.1 and 0.3 in the embodiment 2.

In the cathodes 1 for a secondary battery according to the first and second embodiments of the present disclosure, the density of the cathode mixture layer 20 in the coating section 100 may be 3.5 g/cc or more, loading of the cathode mixture layer 20 in the coating section 100 may be 16.0 mg/cm$^2$ or more, the thickness of the cathode collector may be 15 μm or less, and the tensile strength of the collector 10 corresponding to the non-coating section 200 may be 12 kgf/mm$^2$ or more.

In order to form a high-density cathode, the density of the cathode mixture layer 20 should be high, and the minimum density of the cathode mixture layer 20 may be 3.5 g/cc or more in the present disclosure.

Loading of the cathode mixture layer 20 shows how much a cathode active material is coated with respect to the area of the collector 10. Since the cathode 1 of the present disclosure not only should have high density, but should be able to generate energy at a predetermined level or higher, loading of the cathode mixture layer 20 may be 16.0 mg/cm$^2$ or more.

The thickness of the cathode collector 10 may be 15 μm or less, and the tensile strength of the collector 10 may be 12 kgf/mm$^2$ or more not to be thermally bonded in welding after the rolling process.

A method of manufacturing the cathode 1 for a secondary battery according to an embodiment of the present disclosure includes: preparing the cathode collector 10 and applying the cathode mixture layer 20 onto the cathode collector 10. In the applying of the cathode mixture layer 20, the cathode 1, which includes the coating section 100 at which the cathode mixture layer 20 is formed with a uniform thickness in a predetermined region of the cathode collector 10, the non-coating section 200 that is disposed on at least one edge of the coating section 100 on the cathode collector 10 and at which the cathode mixture layer 20 is not formed, and the cushioning section 300 applied with the cathode mixture layer 20 with a thickness smaller than the thickness of the coating section 100 between the coating section 100 and the non-coating section 200, is formed.

The method of manufacturing the cathode 1 for a secondary battery according to an embodiment of the present disclosure may further include rolling the coating section 100 and the cushioning section 300 under the same level of pressure after applying the cathode mixture layer 20.

Rolling of the electrode 1 may be performed after the applying of the cathode mixture layer 20. Since the coating section 100 and the cushioning section 300 are rolled under the same force, the thickness of the cushioning section 300 may be smaller than the thickness of the coating section 100 even after rolling.

The cathode mixture layer 20 may be applied to have a small slope or a stepped structure on the cushioning section 300, depending on the coating methods. After rolling, the cathode 1 may have a shape in which the thickness of the cathode mixture layer 20 in the cushioning section 300 gradually increases as it goes toward the coating section 100 from the non-coating section 200 positioned at least at one side or both sides of the cathode collector 10.

The applying of the cathode mixture layer 20 may be achieved by providing a coating section-slurry outlet for forming the cathode mixture layer 20 in the coating section 100 and a cushioning section-slurry outlet for forming the cathode mixture layer 20 in the cushioning section 300, and then coating the cathode collector 10 with the cathode mixture layer 20 through the two slurry outlets. The two slurry outlets may be simultaneously operated or sequentially operated.

Further, the applying of the cathode mixture layer 20 may be achieved by forming the cathode mixture layer 20 on the coating section 100 using one slurry outlet and then forming the cathode mixture layer 20 on the cushioning section 300 to have a small slope or a stepped structure by removing a portion of the cathode mixture layer 20 at at least one edge of the coating section in which the cathode mixture layer 20 is formed.

Although the present disclosure was described in detail with reference to detailed embodiments, the embodiments are provided only to describe the present disclosure in detail and the present disclosure is not limited to the embodiments. Further, it is apparent that the present disclosure may be changed and improved by those skilled in the art without departing from the spirit of the present disclosure.

Simple changes and modifications of the present disclosure are included in the range of the present disclosure and the detailed protection range of the present disclosure will be made clear by claims.

What is claimed is:

1. A cathode for a secondary battery which includes a cathode collector and a cathode mixture layer on the cathode collector, the cathode comprising:
   a coating section at which the cathode mixture layer is formed with a uniform thickness, the coating section extending in both a longitudinal direction along a length of the cathode collector and in a lateral direction across a width of the cathode collector that is shorter than the length;
   a non-coating section that is disposed on a side of the cathode collector that extends in the longitudinal direction and on which the cathode mixture layer is not formed; and
   a cushioning section at which the cathode mixture layer is formed with a thickness of the cushioning section smaller than a thickness of the coating section at a first location between the coating section and the non-coating section;
   wherein the cushioning section consists of only a first sloped region and a second sloped region,
   wherein the thickness of the cathode mixture layer in the first sloped region of the cushioning section increases gradually at a constant first slope from a first point to a third point and at a constant second slope in the second sloped region from the third point to a second point, wherein the first point is at a boundary between the non-coating section and the cushioning section, wherein the second point is at a boundary between the cushioning section and the coating section, wherein the third point is disposed between the first and second points, and wherein a ratio of the thicknesses of the cushioning section at the third point and the second point is between 0.5 to 0.8 wherein the third point is spaced apart from the first point by 20% to 60% of a length from the first point to the second point on the collector.

2. A cathode for a secondary battery which includes a cathode collector and a cathode mixture layer on the cathode collector, the cathode comprising:

a coating section at which the cathode mixture layer is formed with a uniform thickness;

a non-coating section that is disposed on at least one edge of the coating section on the cathode collector and at which the cathode mixture layer is not formed; and a cushioning section at which the cathode mixture layer is formed with a thickness smaller than a thickness of the coating section at a location between the coating section and the non-coating section, wherein the first point is at a boundary between the non-coating section and the cushioning section, wherein the second point is at a boundary between the cushioning section and the coating section, wherein the third point is disposed between the first and second points, and wherein the fourth point is disposed between the second and third points, wherein the thickness of the cushioning section gradually increases toward a second point that is a boundary between the cushioning section and the coating section from a first point that is a boundary between the non-coating section and the cushioning section, wherein the thickness of the cathode mixture layer at the third point is 20% to 50% of the thickness of the cathode mixture layer in the coating section, the thickness of the cathode mixture layer in the cushioning section gradually increases from the third point to the fourth point, wherein a thickness difference between the third point and the fourth point is within 30% of the thickness of the cathode mixture layer in the coating section, wherein a distance between the first point and the third point on the collector is 20% to 40% of a distance between the first point and the second point on the collector, and wherein a distance between the third point and the fourth point on the collector is 20% to 40% of a distance between the first point and the second point on the collector.

3. The cathode of claim 2, wherein the thickness of the cathode mixture layer at the third point is 50% to 60% of the thickness of the cathode mixture layer in the coating section, the thickness of the cathode mixture layer in the cushioning section gradually increases from the third point to the fourth point, and a thickness difference between the third point and the fourth point is within 20% of the thickness of the cathode mixture layer in the coating section.

4. The cathode of claim 2, wherein the thickness of the cathode mixture layer at the third point is 60% to 70% of the thickness of the cathode mixture layer in the coating section, the thickness of the cathode mixture layer in the cushioning section gradually increases from the third point to the fourth point, and a thickness difference between the third point and the fourth point is within 15% of the thickness of the cathode mixture layer in the coating section.

5. The cathode of claim 1, wherein density of the cathode mixture layer in the coating section is 3.5 g/cc or more.

6. The cathode of claim 1, wherein loading of the cathode mixture layer in the coating section is 16.0 mg/cm$^2$ or more.

7. The cathode of claim 1, wherein a thickness of the cathode collector is 15 μm or less.

8. The cathode of claim 1, wherein tensile strength of the collector corresponding to the non-coating section is 12 kgf/mm$^2$ or more.

9. The cathode of claim 2, wherein density of the cathode mixture layer in the coating section is 3.5 g/cc or more.

10. The cathode of claim 2, wherein loading of the cathode mixture layer in the coating section is 16.0 mg/cm$^2$ or more.

11. The cathode of claim 2, wherein a thickness of the cathode collector is 15 μm or less.

12. The cathode of claim 2, wherein tensile strength of the collector corresponding to the non-coating section is 12 kgf/mm$^2$ or more.

* * * * *